_____

US009826530B2

(12) United States Patent
Yamasaki et al.

(10) Patent No.: US 9,826,530 B2
(45) Date of Patent: Nov. 21, 2017

(54) COMMUNICATION SYSTEM, COMMUNICATION DEVICE, COMMUNICATION CONTROL METHOD, AND NON-TRANSITORY COMPUTER READABLE MEDIUM

(71) Applicant: NEC Corporation, Minato-ku, Tokyo (JP)

(72) Inventors: Yasuhiro Yamasaki, Tokyo (JP); Norihito Fujita, Tokyo (JP); Hideaki Sone, Sendai (JP); Hideaki Goto, Sendai (JP)

(73) Assignee: NEC CORPORATION, Tokyo (JP)

( * ) Notice: Subject to any disclaimer, the term of this patent is extended or adjusted under 35 U.S.C. 154(b) by 82 days.

(21) Appl. No.: 14/766,003

(22) PCT Filed: Oct. 17, 2013

(86) PCT No.: PCT/JP2013/006161
 § 371 (c)(1),
 (2) Date: Aug. 5, 2015

(87) PCT Pub. No.: WO2014/132303
 PCT Pub. Date: Sep. 4, 2014

(65) Prior Publication Data
 US 2015/0373705 A1    Dec. 24, 2015

(30) Foreign Application Priority Data

Feb. 27, 2013   (JP) .................................. 2013-037164

(51) Int. Cl.
 *H04W 72/04* (2009.01)
 *H04W 74/04* (2009.01)
 (Continued)

(52) U.S. Cl.
 CPC ....... *H04W 72/0446* (2013.01); *H04W 12/06* (2013.01); *H04W 74/04* (2013.01); *H04W 84/12* (2013.01)

(58) Field of Classification Search
 CPC ......... G09G 3/3688; G11C 11/00; H04J 1/16; H04L 5/0044; H04L 43/0847; H04W 72/04
 See application file for complete search history.

(56) References Cited

U.S. PATENT DOCUMENTS

| 2005/0117384 A1* | 6/2005 | Tsuda ................... G09G 3/3688 365/152 |
| 2006/0133293 A1* | 6/2006 | Pan ...................... H04L 43/0847 370/252 |
| 2012/0147843 A1* | 6/2012 | Pison ................... H04L 5/0044 370/330 |

FOREIGN PATENT DOCUMENTS

| JP | 3-46832 A | 2/1991 |
| JP | 2000-151494 A | 5/2000 |

(Continued)

OTHER PUBLICATIONS

Q. Ni et al., "Saturation throughput analysis of error-prone 802.11 wireless networks," Wireless Communications and Mobile Computing, vol. 5, pp. 945-956, 2005.11.

(Continued)

*Primary Examiner* — Andrew Lai
*Assistant Examiner* — Leon Andrews

(57) ABSTRACT

A communication system that improves the total throughput of the communication is provided. A communication system (1) according to the present invention includes a plurality of terminals and an access point (201) with which the terminals communicate. The terminal acquires the number of terminals in a communication network of the access point (201), and divides, based on the number of terminals, the plurality of terminals into groups so that each group includes the number of terminals equal to or smaller than the number of terminals permitted to communicate with the access point (201) within a predetermined period. The terminal allocates the group to the predetermined period, and determines, based on the group to which a terminal belongs, whether to permit data transmission within the predetermined period to which the group is allocated.

10 Claims, 9 Drawing Sheets

(51) Int. Cl.
*H04W 12/06* (2009.01)
*H04W 84/12* (2009.01)

(56) References Cited

FOREIGN PATENT DOCUMENTS

| | | |
|---|---|---|
| JP | 2000-341292 A | 12/2000 |
| JP | 2011-44930 A | 3/2011 |
| JP | 2013-172414 A | 9/2013 |
| JP | 2013-207384 A | 10/2013 |

OTHER PUBLICATIONS

Yuki Nakato et al., "A CSMA/CA Scheme with Virtual Group for Two-hop WLAN Systems", IEICE Technical Report IN, Joho Network 111(295), The Institute of Electronics, Information and Communication Engineers, 2011. 11, pp. 7 to 12.

Takeshi Ogawa et al., "M2M-mo deno Musen Random Access ni Okeru Tanmatsu Group Tan'i no Kohei na Fukuso Seigyo Hoshiki no Kento", Technical Report of IEICE, vol. 112, The Institute of Electronics, Information and Communication Engineers, 2012. 05, pp. 33 to 38.

International Search Report for PCT Application No. PCT/JP2013/006161, dated Jan. 14, 2014.

\* cited by examiner

COMMUNICATION SYSTEM, COMMUNICATION DEVICE, COMMUNICATION CONTROL METHOD, AND NON-TRANSITORY COMPUTER READABLE MEDIUM

This application is a National Stage Entry of PCT/JP2013/006161 filed on Oct. 17, 2013, which claims priority from Japanese Patent Application 2013-037164 filed on Feb. 27, 2013, the contents of all of which are incorporated herein by reference, in their entirety.

TECHNICAL FIELD

The present invention relates to a communication system, a communication device, a communication control method, and a non-transitory computer readable medium.

BACKGROUND ART

One example related to the present invention includes a radio communication in an environment as shown in FIG. 1.

In a communication system 1 as shown in FIG. 1, there are a large number of terminals 100a-1 to 100a-N within radio range of an access point 201.

As a first related example, in normal wireless LAN communications such as IEEE802.11a, 802.11b, and 802.11g, the Carrier Sense Multiple Access with Collision Avoidance (CSMA/CA) method is employed in a Media Access Control (MAC) layer. In the CSMA/CA method, communication is carried out in the order of 1) carrier wave sensing, 2) multiple access, and 3) collision avoidance.

In the carrier wave sensing, the terminal attempts to perform reception once before starting the communication to check whether there is another host that is currently performing communication. In a multiple access, the terminal starts the communication if there are no other terminals sharing the same channel that are currently performing communication. When there is another terminal that is currently performing communication at the stage of the carrier wave sensing, the terminal waits for a random length of time after detecting termination of communication of the terminal that has been performing the communication and then attempts to perform transmission again. This random length of waiting time gradually decreases to prevent a situation in which performance of transmission is permanently not possible.

When a plurality of terminals simultaneously perform transmission under such a circumstance, radio wave interference occurs, which results in a failure of data transmission/reception. The radio wave interference will be described with reference to FIG. 2. The radio wave interference can be mainly classified into two types: adjacent interference and hidden-terminal interference. The adjacent interference occurs when radio terminals (a terminal A and a terminal B) that are within the same communication range simultaneously start transmission. In such a case, neither of these radio terminals can receive data that has been sent. The hidden-terminal interference is generally called a hidden-terminal problem, which occurs when radio terminals (a terminal C and a terminal E) that are not within the same communication range simultaneously start to transmit data to a radio terminal D. The radio terminal D receives neither data from the terminal C nor data from the terminal E.

Since the radio wave interference described above occurs due to the presence of other radio terminals that attempt to perform transmission simultaneously, the probability that the radio wave interference occurs increases with an increase in the number of radio terminals or an increase in the traffic density of the radio communication. FIG. 3 (cited from Non-Patent Literature 1) shows a graph showing a relation between the number of radio terminals and the total throughput. The graph in FIG. 3 shows that the total throughput decreases with the increase in the number of radio terminals.

CITATION LIST

Non-Patent Literature

[Non-Patent Literature 1] Q. Ni, et al., "Saturation throughput analysis of error-prone 802.11 wireless networks," Wireless Communications and Mobile Computing, vol. 5, pp. 945-956

SUMMARY OF INVENTION

Technical Problem

As stated above, the first problem of the method according to the related art is that the total throughput of a network decreases with an increase in the number of radio terminals or an increase in a traffic density of a radio communication.

The present invention aims to provide a communication system, a communication device, a communication control method, and a non-transitory computer readable medium that improve the total throughput of the communication.

Solution to Problem

A communication system according to one exemplary aspect includes a plurality of terminals and an access point with which the terminals communicate.

The communication system includes: means for acquiring the number of terminals in a communication network of the access point; means for dividing, based on the number of terminals, the plurality of terminals into groups so that each group includes the number of terminals equal to or smaller than the number of terminals permitted to communicate with the access point within a predetermined period; means for allocating the group to the predetermined period; and means for determining, based on the group to which a terminal belongs, whether to permit data transmission within the predetermined period to which the group is allocated.

A communication device according to one exemplary aspect includes: means for acquiring the number of communication devices in a communication network of an access point; means for dividing, based on the number of communication devices, the communication devices into groups so that each group includes the number of communication devices equal to or smaller than the number of communication devices permitted to communicate with the access point within a predetermined period; means for allocating the group to the predetermined period; and means for determining, based on the group to which a terminal belongs, whether to permit data transmission within the predetermined period to which the group is allocated.

A communication control method according to one exemplary aspect includes the steps of: acquiring the number of terminals in a communication network of an access point; dividing, based on the number of terminals, the terminals into groups so that each group includes the number of terminals equal to or smaller than the number of terminals permitted to communicate with the access point within a predetermined period; allocating the group to the predetermined period; and determining, based on the group to which a terminal belongs, whether to permit data transmission within the predetermined period to which the group is allocated.

A non-transitory computer readable medium according to one exemplary aspect causes a computer to execute the following steps of: acquiring the number of communication devices in a communication network of an access point; dividing, based on the number of communication devices, communication devices into groups so that each group includes the number of communication devices equal to or smaller than the number of communication devices permitted to communicate with the access point within a predetermined period; allocating the group to the predetermined period; and determining, based on the group to which a communication device belongs, whether to permit data transmission within the predetermined period to which the group is allocated.

Advantageous Effects of Invention

According to the present invention, it is possible to improve a decrease in the total throughput of a network when the number of communication terminals is large or a traffic density of a radio communication is high.

DESCRIPTION OF EMBODIMENTS

In the method according to the related art, the timing of the data transmission between the plurality of terminals is not appropriate. In the related art, instead of adjusting the transmission timing between the terminals, the transmission timing and the transmission latency have been determined based on the state of each terminal. Since the adjustment of the transmission timing is not explicitly executed between the terminals, in the CSMA method, all the terminals that desire to transmit data need to compete to acquire the data transmission right. This increases the number of competitors, resulting in an increase in the data transmission latency due to the radio wave interference.

In the present invention, instead of determining the data transmission timing between the plurality of terminals based on only the state of each terminal, the data transmission timing between the plurality of terminals is adjusted between the terminals by referring to the information distributed from a system or a person that manages the network. According to this adjustment, the number of terminals that transmit data in a specified period of time is limited. That is, the number of terminals that transmit data in a specified period of time is limited to the number equal to or smaller than the number of terminals permitted to communicate with an access point within a predetermined period. As a result, even when the CSMA method is employed in a lower layer, the terminals that desire to transmit data and further have the right to perform transmission according to the adjustment result compete to acquire the data transmission right. Since the adjustment is performed between the terminals, the competition rate decreases compared to the number of terminals that exist, which decreases the data transmission latency due to the radio wave interference.

First Exemplary Embodiment (Static Distribution)

Figure 4:
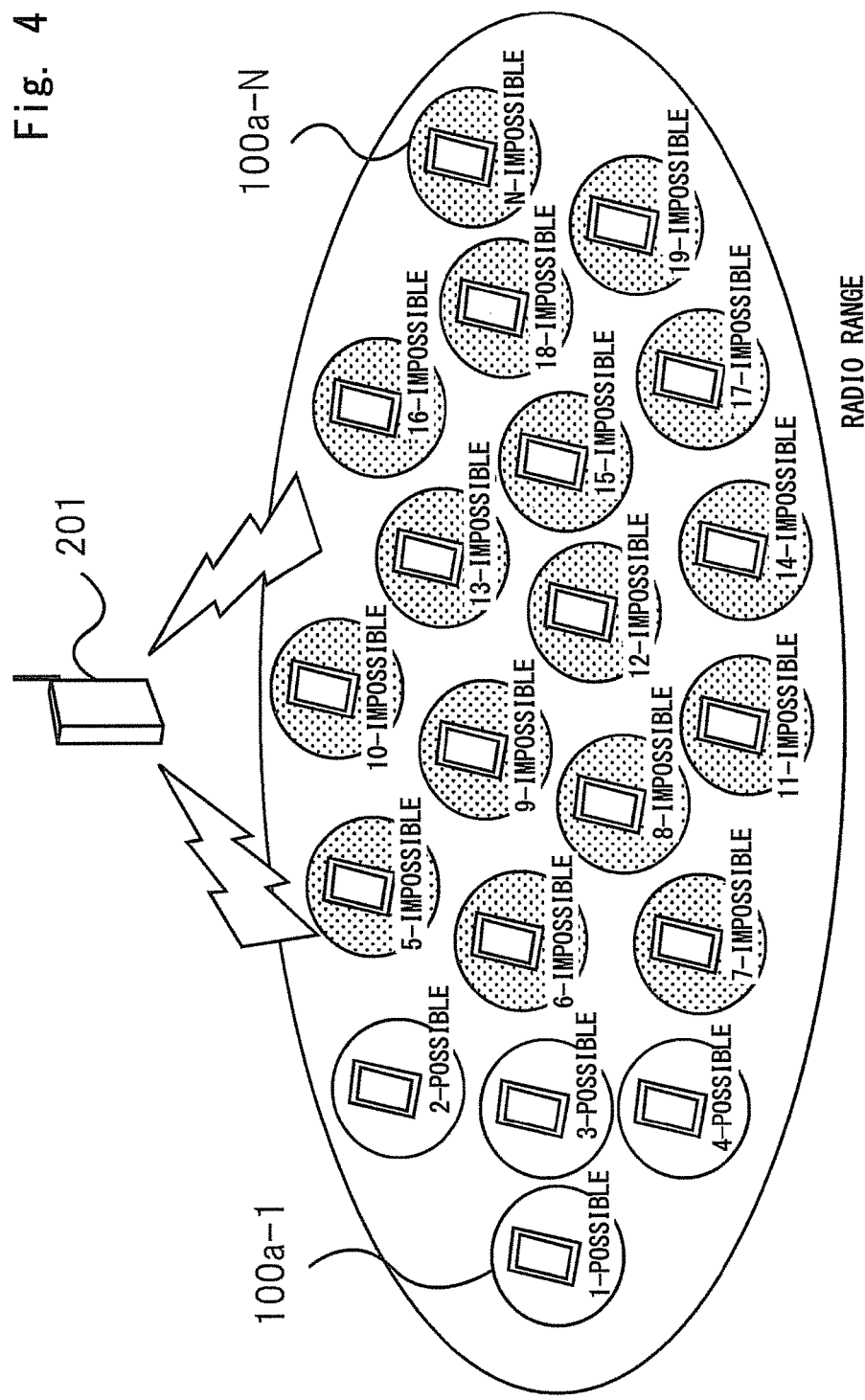
FIG. 4 is a diagram of a communication state according to a first exemplary embodiment.
Figure 5:
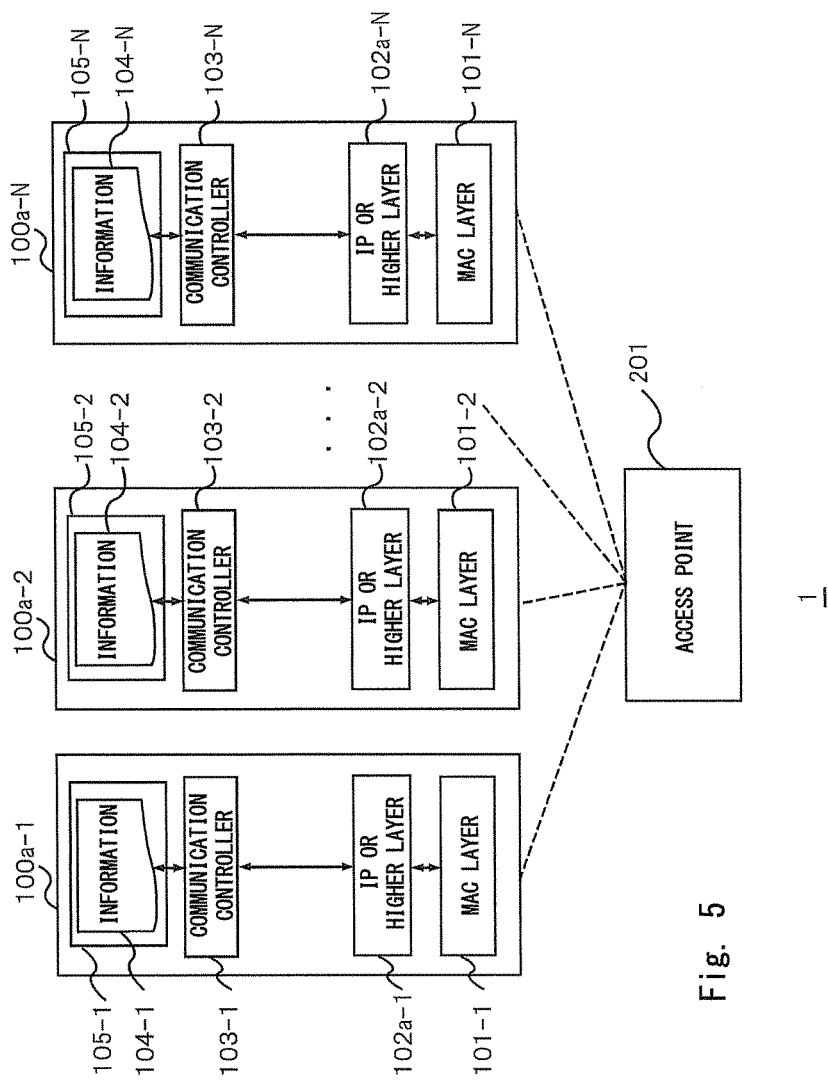
FIG. 5 is a block diagram according to the first exemplary embodiment.
Figure 6:
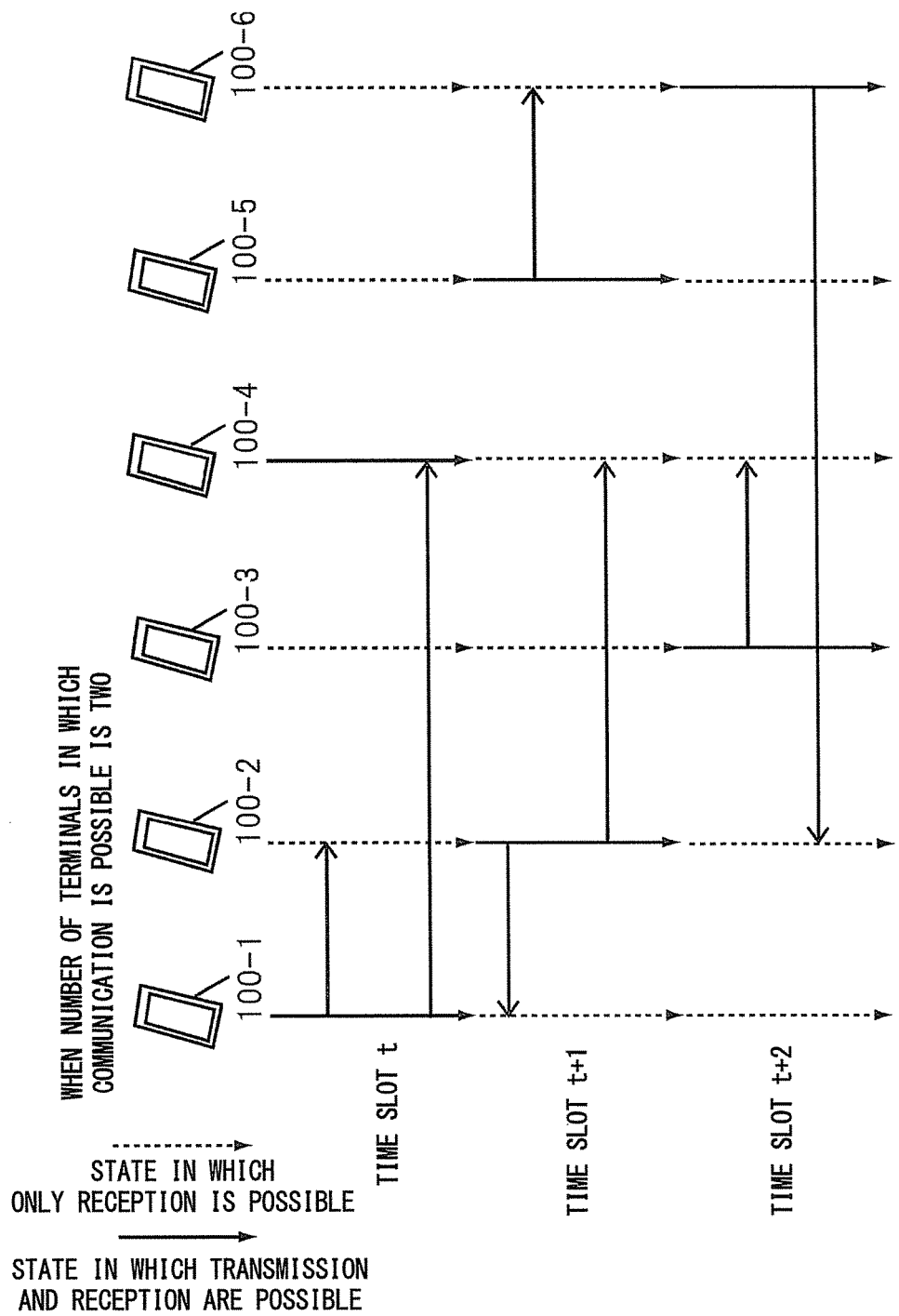
FIG. 6 is a diagram of a communication example according to the first exemplary embodiment.

Next, exemplary embodiments of the present invention will be described taking a communication state shown in FIG. 4 as an example. This exemplary embodiment shows an example in which communication is performed among terminals 100a-1 to 100a-N. FIG. 5 is a block diagram of the first exemplary embodiment of the present invention. FIG. 6 is a communication example in the first exemplary embodiment.

In the first exemplary embodiment, a communication system 1 includes N terminals from a terminal 100a-1 to a terminal 100a-N and an access point 201. The terminal 100a-1 includes a MAC layer 101-1, an IP or higher layer 102a-1, a communication controller 103-1, information 104-1, and an information storage unit 105-1. The internal configuration of the N−1 terminals from the terminal 100a-2 to the terminal 100a-N is similar to that of the terminal 100a-1.

In the exemplary embodiment, the information 104-1 to the information 104-N are acquired from a person or a system that manages the network. One specific example of the information 104-1 is an identification number (each terminal has a different number). The identification numbers may be, for example, numbers sequentially allocated to the terminals based on the total number of terminals. There are also group numbers calculated based on the identification number (terminals are divided into groups and each group is given a different number). A method for determining the group will be described later.

In this exemplary embodiment, a case in which number 1 is added to the terminal 100a-1, number 2 is added to the terminal 100a-2, number 3 is added to the terminal 100a-3, number 4 is added to the terminal 100a-4, number 5 is added to the terminal 100a-5, and number 6 is added to the terminal 100a-6 will be described as an example. This information is stored in the information storage unit 105 in the terminal 100 and is referred to by the communication controller 103-1.

The communication controller 103-1 refers to the information 104-1, acquires the number of terminals in the communication network of the access point, and determines whether to set the terminal 100a-1 to a state in which transmission and reception are possible or a state in which reception is possible. The state in which reception is possible means a state in which the terminal only performs reception, not transmission. The result of the determination is sent to the IP or higher layer 102a-1. The determination may be made by holding a common rule by the communication controllers 103-1 to 103-N and comparing this information with the information 104-1. It is defined, for example, that the identification number is divided by 3 as the common rule. In this case, it is determined whether to set the terminal 100a-1 to the state in which transmission and reception are possible or the state in which reception is possible according to the number of the remainder. Time is then divided into time slots by appropriate units (predetermined period) to vary the number of remainders where it is determined that the terminal can perform transmission and reception for each time slot. That is, the group is allocated to each time slot.

As one example, in the time slot t, the remainder 1 indicates the state in which transmission and reception are possible and the other remainders indicate the state in which reception is possible. In the time slot t+1, the remainder 2 indicates the state in which transmission and reception are possible and the other remainders indicate the state in which reception is possible. In the time slot t+2, the remainder 0 indicates the state in which transmission and reception are possible and the other remainders indicate the state in which reception is possible. According to such a determination, the number of terminals that can perform transmission in a given time can be adjusted.

Figure 9:
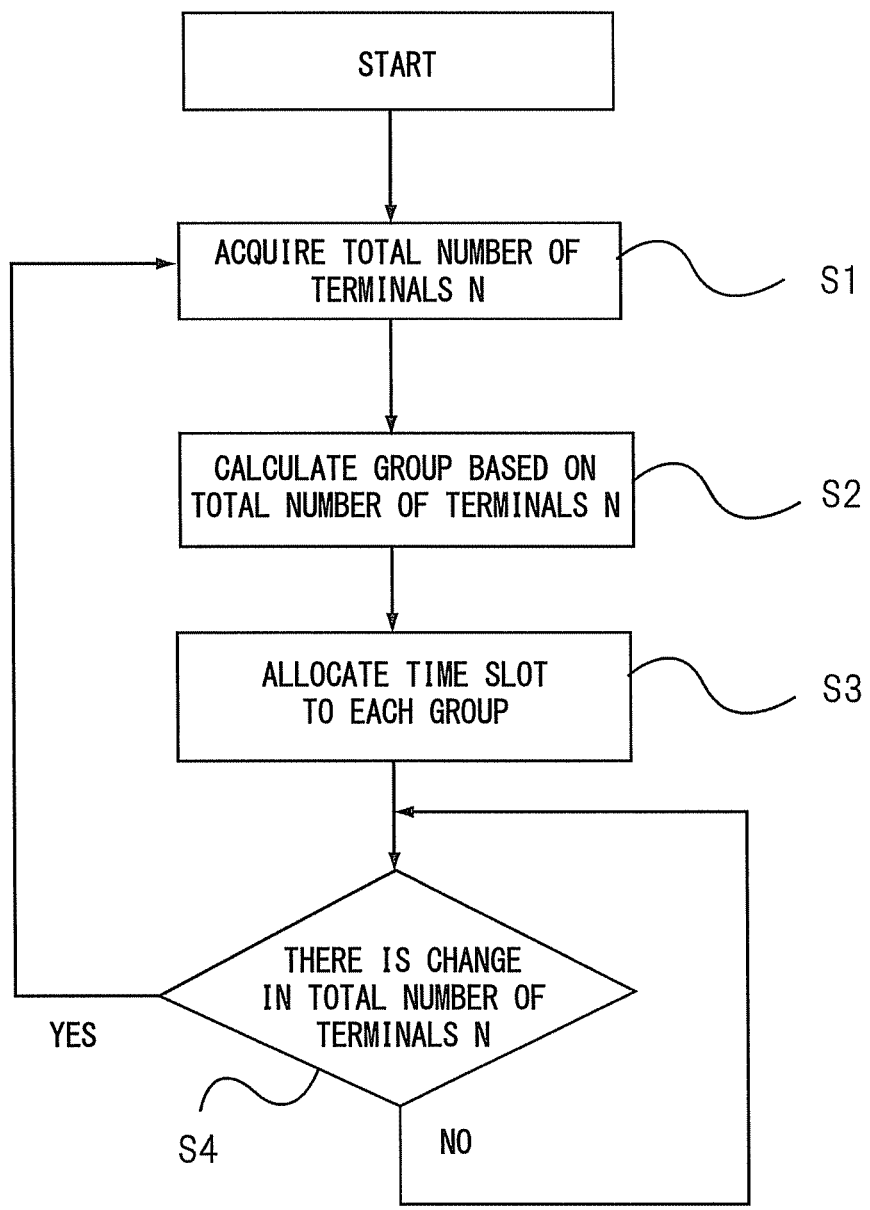
FIG. 9 is a flowchart of grouping of terminals according to the present invention.

Hereinafter, with reference to a flowchart in FIG. 9, processing for allocating the group of the terminals 100a-1 to 100a-N to the time slot will be described.

The terminal 100a-1 acquires the total number of terminals N (S1). The total number of terminals may be acquired by the communication between terminals via the network, may be input by the network administrator, or may be distributed to each terminal by the access point 201. The data of the total number of terminals is stored in the information storage unit 105-1 as the information 104-1. The communication controller 103-1 reads out the total number of terminals N from the information storage unit 105-1 and calculates the group based on the total number of terminals N using the remainders, for example, as stated above (S2).

The total number of terminals that belong to each group is limited to a predetermined number so that it is unlikely that data collision will occur in each time slot. According to this processing, the competitors are limited in each time slot, the number of times of data retransmission due to data collision decreases, and the data transmission latency decreases. The communication controller 103-1 stores the group information in the information storage unit 105-1. Next, the communication controller 103-1 allocates the group that is calculated to the time slot (S3). The communication controller 103-1 executes the above Steps S1-S3 at predetermined time intervals. When there is a change in the total number of terminals N (Yes: S4), the process goes back to Step S1 and the group is reorganized. When there is no change in the total number of terminals (No: S4), the communication controller 103-1 keeps the current state.

The method for grouping the terminals using the remainders of the identification numbers has been described above. The method is not limited to this one and any kind of method may be used as long as it is possible to group terminals based on the number of terminals which can transmit and receive data. Such a control may be performed, for example, so as to prioritize various types of traffic (voice, movie, text and the like), group the terminals according to the priority of the frame, and allocate the group to the time slot so that the data collision rate in the high-priority group becomes lower than the data collision rate in the other groups.

The time slot may be changed at predetermined time intervals or may be changed according to the occurrence of an event. Various methods including a method in which a scheduling algorithm is applied may be used as a determination rule. The result of the determination here is sent to the IP or higher layer 102a-1.

The IP or higher layer 102a-1 receives from the communication controller 103-1 the result indicating whether to set the terminal 100a-1 to the state in which transmission and reception are possible or the state in which reception is possible. While an operation of the IP or higher layer 102a-1 is generalized in this example, this mechanism may be implemented in any layer such as an IP layer, a TCP protocol, a UDP protocol, or a higher application layer. Further, it may be regarded as middleware or an application that controls the MAC layer. In order to transmit data from the terminal 100a-1 to another device, the IP or higher layer 102a-1 is able to transmit actual data generated by the user or a higher application to another terminal upon receiving a notification from the communication controller 103-1 indicating that the terminal 100a-1 is in the state in which transmission and reception are possible and passes the data that has been generated to the MAC layer 101-1 which is a lower layer.

On the other hand, when a notification is sent from the communication controller 103-1 indicating that the terminal 100a-1 is in the state in which reception is possible, it is regarded that transmission of the actual data generated by the user or the higher application is to be prohibited and the data that has been generated is accumulated in the IP or higher layer 102a-1. When time slots sequentially advance due to an elapse of time or the occurrence of an event and it is determined in the communication controller 103-1 that the terminal 100a-1 is in the state in which transmission and reception are possible, the data that is accumulated is passed to the MAC layer 101-1 which is the lower layer. When data is transmitted to the terminal 100a-1 from another device, the IP or higher layer 102a-1 receives the data from the MAC layer 101-1 which is the lower layer, and then passes the received data to the target application regardless of the result of determination in the communication controller 103-1 (regardless of whether the terminal 100a-1 is in the state in which transmission and reception are possible or the state in which reception is possible).

The MAC layer 101-1 performs MAC processing, which is communication processing with another terminal. In this example, CSMA processing of a wireless LAN or the like is carried out. In order to transmit data from the terminal 100a-1, the MAC layer 101-1 transmits the data received from the IP or higher layer 102a-1 to the destination terminal. In order to receive data from another device, the MAC layer 101-1 passes the data received from the other device to the IP or higher layer 102a-1.

While the communication processing has been described taking the terminal 100a-1 as an example in the exemplary embodiment, similar processing is carried out also in the other terminals 100a-M (M=1, 2, . . . , N).

Further, the communication with the terminal 100a-M (M=1, 2, . . . , N) is carried out via the access point 201.

Described above is the process flow of the first exemplary embodiment of the present invention.

Figure 1:
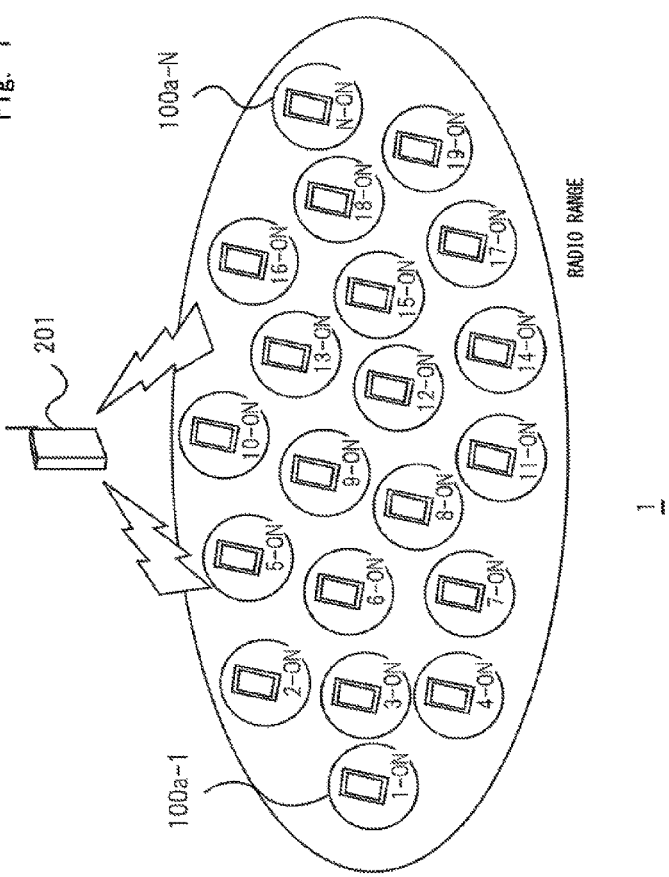
FIG. 1 is a diagram showing a communication state in a radio congestion environment.
Figure 2:
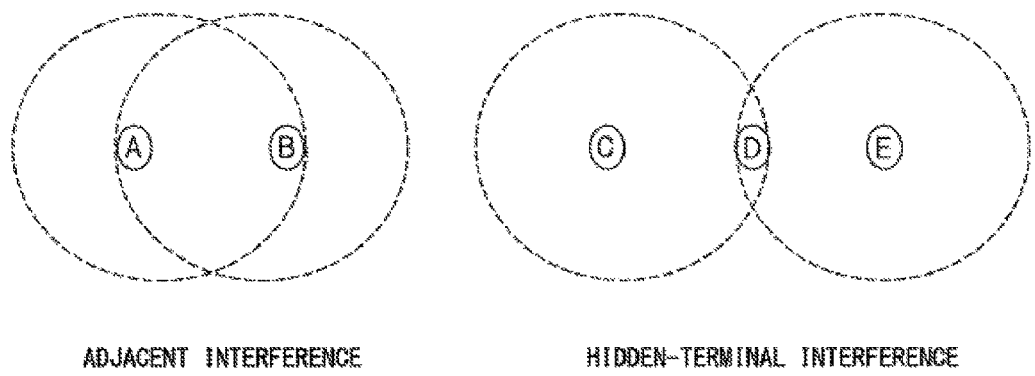
FIG. 2 is a diagram of an example of radio wave interference.
Figure 3:
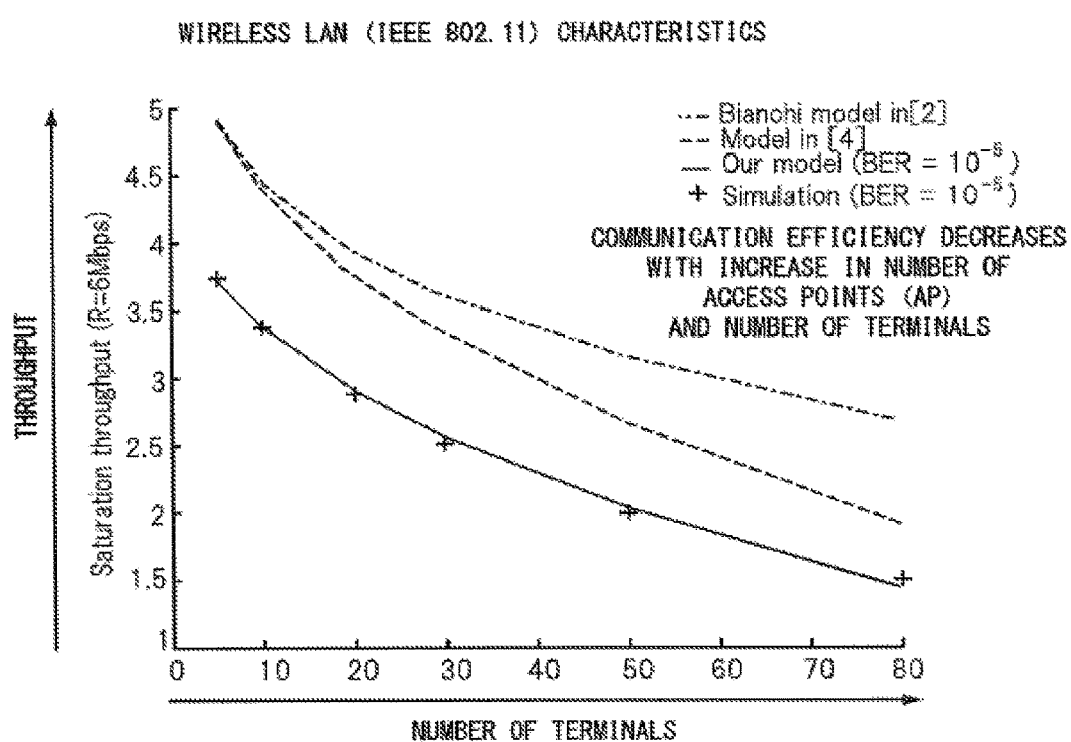
FIG. 3 is a diagram showing characteristics of a wireless LAN.

In the related art described in Background Art, all the terminals are able to transmit and receive data as shown in FIG. 1, which results in an increase in the collision rate due to radio wave interference. This increases the transmission latency for retransmission and reduces the total throughput.

On the other hand, in this exemplary embodiment, it is determined in the communication controller 103-1 whether the terminal 100a-1 is set to the state in which transmission and reception are possible or the state in which reception is possible based on the information 104-1. It is therefore possible to reduce the number of candidate terminals which are to execute transmission and to reduce the collision rate due to radio wave interference. It is therefore possible to reduce the transmission latency for retransmission and to reduce the total throughput.

While it is determined in the communication controller 103-1 whether to set the terminal 100a-1 to the state in which transmission and reception are possible or the state in which reception is possible in this exemplary embodiment, it may be determined whether to switch the communication ON or OFF. In this case, the operation of the MAC layer 101-1 or the IP or higher layer 102a-1 when data is transmitted is the same as that in the case in which it is determined in the communication controller 103-1 whether to set the terminal 100a-1 to the state in which transmission and reception are possible or the state in which reception is possible. However, when the communication is OFF, the terminal 100a-1 can perform neither data transmission nor data reception.

Further, while the terminals perform communication via the access point 201 in this exemplary embodiment, the terminals may directly perform communication each other by the ad-hoc communication, the Wi-fi Direct (registered trademark) or the like without the intervention of the access point.

Further, the radio terminals may not necessarily be used in this exemplary embodiment and some or all of the terminals may be connected by a wired network.

Second Exemplary Embodiment (Authentication System)

Next, a second exemplary embodiment of the present invention will be described taking a communication state shown in FIG. 4 as an example. In this exemplary embodiment, an example in which communication is performed among terminals 100b-1 to 100b-N will be described.

Figure 7:
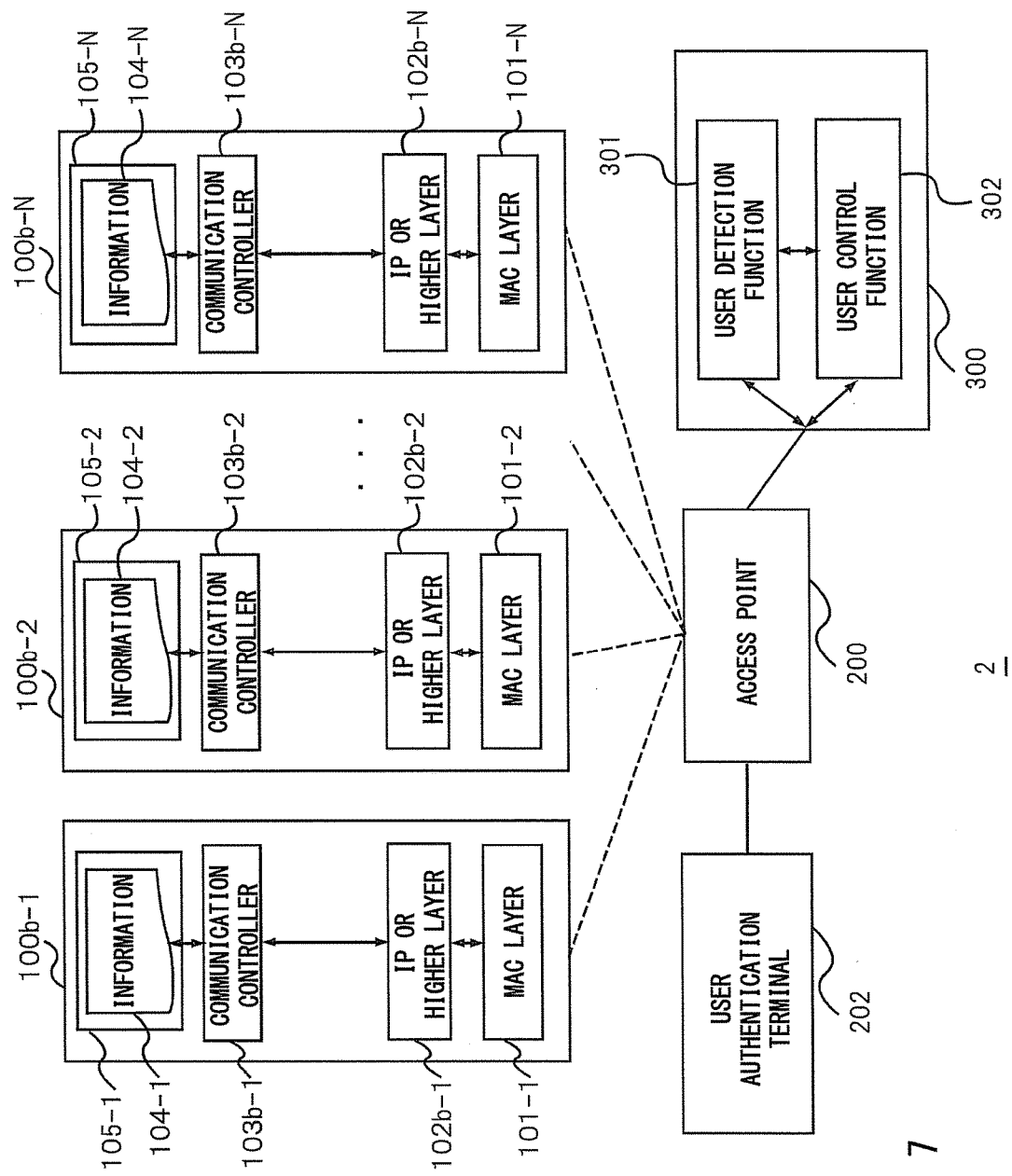
FIG. 7 is a block diagram according to a second exemplary embodiment.
Figure 8:
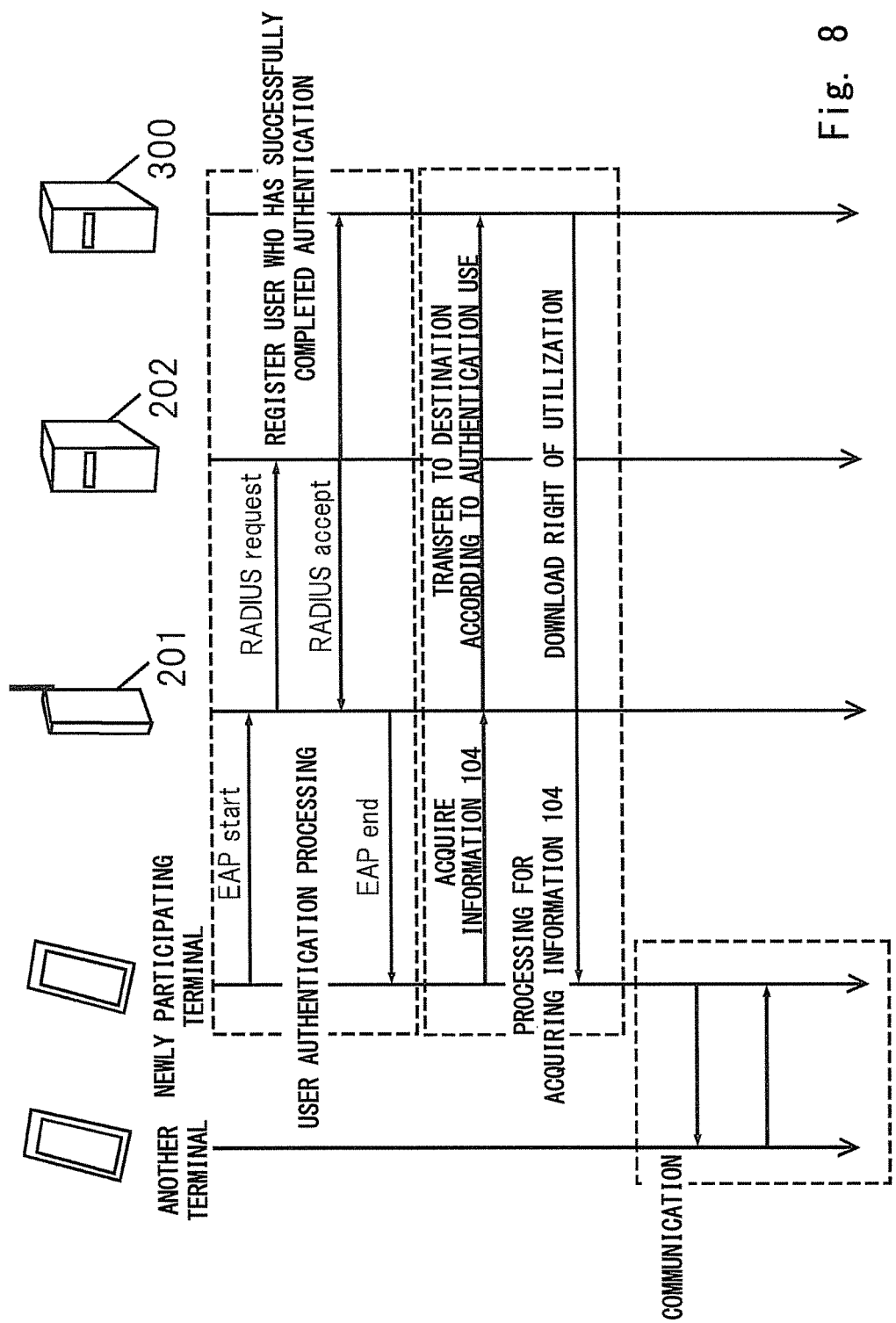
FIG. 8 is a communication sequence diagram according to the second exemplary embodiment.

FIG. 7 is a block diagram of the second exemplary embodiment of the present invention. FIG. 8 is a communication sequence in the second exemplary embodiment.

A communication system 2 according to the second exemplary embodiment includes N terminals from a terminal 100b-1 to a terminal 100b-N, an access point 201, and a user authentication terminal 202 and a communication control terminal 300 as external devices. The terminal 100b-1 includes a MAC layer 101-1, an IP or higher layer 102b-1, a communication controller 103b-1, and information 104-1. The internal configuration of the N-1 terminals from the terminal 100b-2 to the terminal 100b-N is similar to that of the terminal 100b-1. Further, the communication control terminal 300 includes a user detection function 301 and a user control function 302.

In this exemplary embodiment, the terminal 100b-M (M=1, 2, . . . , N) executes user authentication such as IEEE802.1X when participating in the network. In the following description, the functional blocks before and after the user authentication will be separately described.

The processing before the user authentication will be described below.

When the terminal user participates in the network, the IP or higher layer 102b-1 creates authentication data by the IP or higher layer 102b-1 to transmit the authentication data to the MAC layer 101b-1. In the case of IEEE802.1X, the authentication data corresponds to Extensible Authentication Protocol (EAP) packets. Upon receiving the EAP packets from the MAC layer 101b-1, the IP or higher layer 102b-1 interprets the result. In IEEE802.1X, when accept packets are received, a normal communication can be made possible. While the case in which IEEE802.1X is used as the user authentication method has been described, any generally available authentication method may be used as long as the user can manage the method.

Upon receiving the EAP packets, the access point 201 converts the received packets into Remote Authentication Dial In User Service (RADIUS) packets, and transmits it to the user authentication terminal 202. Meanwhile, upon receiving the RADIUS packets, the access point 201 converts the received packets into the EAP packets, and transmits it to the terminal. When the user authentication is successfully completed, the MAC address of the terminal in which the user authentication has been successfully completed is registered in the access point 201. In the following processing, the communication of the terminal that has been successfully authenticated can also be performed using packets other than authentication packets.

Upon receiving the RADIUS packets, the user authentication terminal 202 performs user authentication processing. Any generally available authentication method may be used as the user authentication method. When the processing of user authentication is completed, the result is transmitted to the access point 201. When the user authentication is successfully completed, the information of the user successfully authenticated is sent to the user detection function 301. The information that is sent may be, for example, such as the number of persons that have been successfully authenticated and the priorities.

Upon receiving data from the user authentication terminal 202, the user detection function 301 analyzes the data and collects information on the terminal where user authentication has been successfully completed. The most basic information is, for example, the number of persons that have successfully completed the user authentication. By counting this value, it is possible to detect the number of terminals that are currently participating in the network. Alternatively, the priority of the users that have successfully completed the authentication may be counted to grasp the total priority of the terminals that are currently participating in the network. This information is collected to grasp the network status. At the same time, the user's information is grasped using the information such as the MAC address that can be grasped at the time of user authentication. The information on the users or the network status grasped here is sent to the user control function 302.

The user control function 302 acquires the information on the user or the network status from the user detection function 301. The network status includes, for example, the total number of terminals that are participating in the network, and the user information includes, for example, a MAC address or an IP address. When the user control function 302 receives a request for transmitting the information 104-M (M=1, 2, . . . , N) from the terminal 100b-M (M=1, 2, . . . , N), the user control function 302 generates the information 104-M (M=1, 2, . . . , N) and transmits the information 104-M to the terminal 100b-M (M=1, 2, . . . , N) which has sent the transmission request. The order in which the terminals have participated in the network and the result in which the user control function 302 has grouped the users from the user attributes at the time of authentication using the method in FIG. 9 are recorded as the information 104-M.

Upon receiving packets indicating the success in authentication from the MAC layer 101-1, the communication controller 103b-1 creates a request for transmitting the information 104-1 to the user detection function 301 of the communication control terminal 300, and sends the request to the MAC layer 101-1. Upon receiving the information 104-1 from the MAC layer 101-1, the communication controller 103b-1 stores this information.

The MAC layer 101-1 transmits the data sent from the IP or higher layer 102-1 to the network and receives packets from the network to pass the packets, and sends it to the IP or higher layer 102-1.

The processing after the user authentication will be described below.

The processing in the access point 201 and the terminals 100b-1 to 100b-N after the user authentication is similar to that in the first exemplary embodiment.

Note that the communication controller 103b-1 periodically creates the request for transmitting the information 104-1 to the user detection function 301 of the communication control terminal 300 to grasp the current status of the network, and sends it to the MAC layer 101-1. Upon receiving the information 104-1 from the MAC layer 101-1, the communication controller 103b-1 stores this information.

The operation of the communication control terminal 300 does not change before and after the user authentication, and the communication control terminal 300 periodically receives the request for transmitting the information 104-1 from the communication controller 103b-1. As a result, the communication control terminal 300 generates the latest information 104-1 to send it to the terminal 100-1. Described above is the process flow in the second exemplary embodiment of the present invention.

In the related art described in Background Art, all the terminals are able to transmit and receive data as shown in FIG. 1, which results in an increase in the collision rate due to radio wave interference. This increases the transmission latency for retransmission and reduces the total throughput.

On the other hand, in this exemplary embodiment, it is determined in the communication controller 103b-1 whether the terminal 100b-1 is set to the state in which transmission and reception are possible or the state in which reception is possible based on the information 104-1. It is therefore possible to reduce the number of candidate terminals which is to execute transmission and to reduce the collision rate due to radio wave interference. It is therefore possible to reduce the transmission latency for retransmission and to reduce the total throughput.

While it is determined in the communication controller 103b-1 whether to set the terminal 100b-1 to the state in which transmission and reception are possible or the state in which reception is possible in this exemplary embodiment, it may be determined whether to switch the communication ON or OFF. In this case, the operation of the MAC layer 101-1 or the IP or higher layer 102b-1 when data is transmitted is the same as that in the case in which it is determined in the communication controller 103b-1 whether to set the terminal 100b-1 to the state in which transmission and reception are possible or the state in which reception is possible. However, when the communication is OFF, the terminal 100b-1 can perform neither data transmission nor data reception.

Further, in the exemplary embodiment, while the communication control terminal 300 collects the information on the user or the network status after the user authentication terminal 202 authenticates the user, the user authentication terminal 202 is not necessarily required as long as it is possible to collect the information on the user or the network status. For example, when the terminal 100b-M (M=1, 2, . . . , N) participates in the network, the communication controller 103b-1 may directly access the communication control terminal 300 to send a notification of the terminal information.

Further, in this exemplary embodiment, while the terminals perform communication via the access point 201, the terminals may directly perform communication each other by such as the ad-hoc communication, the Wi-fi Direct (registered trademark) or the like without the intervention of the access point.

Further, in this exemplary embodiment, the radio terminals may not necessarily be used and some or all of the terminals may be connected by a wired network.

As described above, the first exemplary effect of the exemplary embodiment is as follows. That is, the communication controller switches the communication ON and OFF or switches the state in which transmission and reception are possible and the state in which reception is possible using the information generated from the information on the user or the network status based on the input from the network administrator or the communication control terminal 300, whereby it is possible to adjust the number of terminals that simultaneously perform communication in consideration of the information on the network. According to this mechanism, it is possible to restrict the number of terminals that simultaneously perform communication and to prevent the degradation in the performance due to the radio wave interference.

Other Exemplary Embodiments

The communication control method described above may be achieved using a semiconductor processing device including an Application Specific Integrated Circuit (ASIC). Further, these processing may be achieved by causing a computer system including at least one processor (e.g., microprocessor, MPU, Digital Signal Processor (DSP)) to execute a program. Specifically, one or a plurality of programs including instructions for causing the computer system to execute the algorithm regarding these transmission signal processing or reception signal processing may be created and this program may be supplied to the computer.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present invention is not limited to the above exemplary embodiments and may be appropriately changed without departing from the spirit of the present invention. The present invention may be applied, for example, to a next-generation wireless LAN standard IEEE 802.11ac.

Further, the above exemplary embodiments are merely examples of applications of technical ideas obtained by the present inventors. Needless to say, these technical ideas are not limited to the above exemplary embodiments and various changes may be performed on these technical ideas.

For example, while a part or all of the above exemplary embodiments may be described as shown in the following Supplementary Notes, they are not limited to the Supplementary Notes.

(Supplementary Note 1)

A communication system comprising a plurality of terminals and an access point with which the terminals communicate, the communication system comprising:

means for acquiring the number of terminals in a communication network of the access point;

means for dividing, based on the number of terminals, the plurality of terminals into groups so that each group includes the number of terminals equal to or smaller than the number of terminals permitted to communicate with the access point within a predetermined period;

means for allocating the group to the predetermined period; and means for determining, based on the group to which a terminal belongs, whether to permit data transmission within the predetermined period to which the group is allocated.

(Supplementary Note 2)

The communication system according to Supplementary Note 1, wherein the means for allocating the group to the predetermined period determines, for each time slot, whether to allow any of the groups to perform data transmission.

(Supplementary Note 3)

The communication system according to Supplementary Note 1 or 2, wherein:

the means for allocating the group allocates the group based on a priority of transmission data, the means for allocating the group to the predetermined period preferentially allocates, among groups based on the priority, a high-priority group to the predetermined period.

(Supplementary Note 4)

The communication system according to any one of Supplementary Notes 1 to 3, wherein, when a new terminal participates in the access point, an external device connected to the communication network authenticates the new terminal and transmits information regarding the terminal including the data of the number of terminals to each of the terminals.

(Supplementary Note 5)

A communication device that can communicate with an access point, the communication device comprising:

means for acquiring the number of communication devices in a communication network of the access point;

means for dividing, based on the number of communication devices, the communication devices into groups so that each group includes the number of communication devices equal to or smaller than the number of communication devices permitted to communicate with the access point within a predetermined period;

means for allocating the group to the predetermined period; and means for determining, based on the group to which a communication device belongs, whether to permit data transmission within the predetermined period to which the group is allocated.

(Supplementary Note 6)

The communication device according to Supplementary Note 5, wherein the means for allocating the group to the predetermined period determines, for each time slot, whether to allow any of the groups to perform data transmission.

(Supplementary Note 7)

The communication device according to Supplementary Note 5 or 6, wherein:

the means for allocating the group allocates the group based on a priority of transmission data, and the means for allocating the group to the predetermined period preferentially allocates, among groups based on the priority, a high-priority group to the predetermined period.

(Supplementary Note 8)

The communication device according to any one of Supplementary Notes 5 to 7, wherein, when a new communication device participates in the access point, the external device connected to the communication network authenticates the new communication device, and transmits information regarding the communication device including the data of the number of communication devices to each of the communication devices.

(Supplementary Note 9)

A communication control method comprising the steps of:

acquiring the number of terminals in a communication network of an access point;

dividing, based on the number of terminals, the terminals into groups so that each group includes the number of terminals equal to or smaller than the number of terminals permitted to communicate with the access point within a predetermined period;

allocating the group to the predetermined period; and determining, based on the group to which a terminal belongs, whether to permit data transmission within the predetermined period to which the group is allocated.

(Supplementary Note 10)

The communication control method according to Supplementary Note 9, wherein the step for allocating the group to the predetermined period determines, for each time slot, whether to allow any of the groups to perform data transmission.

(Supplementary Note 11)

The communication control method according to Supplementary Note 9 or 10, wherein:

the step for allocating the group allocates the group based on a priority of transmission data, and the step for allocating the group to the predetermined period preferentially allocates, among groups based on the priority, a high-priority group to the predetermined period.

(Supplementary Note 12)

The communication control method according to any one of Supplementary Notes 9 to 11, wherein, when a new terminal participates in the access point, an external device connected to the communication network authenticates the new terminal and transmits information regarding the terminal including the data of the number of terminals to each of the terminals.

(Supplementary Note 13)

A non-transitory computer readable medium that causes a computer to execute the following steps of:

acquiring the number of communication devices in a communication network of an access point;

dividing, based on the number of communication devices, the communication devices into groups so that each group includes the number of communication devices equal to or smaller than the number of communication devices permitted to communicate with the access point within a predetermined period;

allocating the group to the predetermined period; and determining, based on the group to which a communication device belongs, whether to permit data transmission within the predetermined period to which the group is allocated.

(Supplementary Note 14)

The non-transitory computer readable medium according to Supplementary Note 13, wherein the step for allocating the group to the predetermined period determines, for each time slot, whether to allow any of the groups to perform data transmission.

(Supplementary Note 15)

The non-transitory computer readable medium according to Supplementary Note 13 or 14, wherein:

the step for allocating the group allocates the group based on a priority of transmission data, and the step for allocating the group to the predetermined period preferentially allocates, among groups based on the priority, a high-priority group to the predetermined period.

(Supplementary Note 16)

The non-transitory computer readable medium according to any one of Supplementary Notes 13 to 15, wherein, when a new communication device participates in the access point, an external device connected to the communication network authenticates the new communication device, and transmits information regarding the communication device including the data of the number of communication devices to each of the communication devices.

While the present invention has been described with reference to the exemplary embodiments, the present invention is not limited to the above exemplary embodiments. Various changes that can be understood by those skilled in the art may be made on the configurations and the details of the present invention within the scope of the present invention.

This application is based upon and claims the benefit of priority from Japanese Patent Application No. 2013-37164, filed on Feb. 27, 2013, the disclosure of which is incorporated herein in its entirety by reference.

REFERENCE SIGNS LIST

1 COMMUNICATION SYSTEM
2 COMMUNICATION SYSTEM
100-1-N MAC LAYER
100a-1-N TERMINAL
102a-1-N IP OR HIGHER LAYER
103-1-N COMMUNICATION CONTROLLER
104-1-N INFORMATION
105-1-N INFORMATION STORAGE UNIT
201 ACCESS POINT
202 USER AUTHENTICATION TERMINAL
301 USER DETECTION FUNCTION

What is claimed is:

1. A communication system comprising:
a plurality of terminals each terminals, each terminal comprising a communication controller, and
an access point with which the terminals communicate, wherein the communication a controller:
acquires a number of terminals connected to an access point in a communication network,
divides, based on the number of terminals, the plurality of terminals into groups so that each group includes the number of terminals equal to or smaller than the number of terminals permitted to communicate with the access point within a predetermined period,
allocates the group to a time slot of the predetermined period, and
determines, based on the group to which a terminal belongs and the time slot to which a group is allocated, whether to permit data transmission from the terminal to the access point.

2. The communication system according to claim 1, wherein only one group is allocated to each time slot as a group which is allowed to perform the data transmission.

3. The communication system according to claim 1, wherein:
the communication controller allocates the group based on a priority of transmission data, and
preferentially allocates a high-priority group to the time slot.

4. The communication system according to claim 1, wherein, when a new terminal participates in the access point, an external device connected to the communication network authenticates the new terminal and transmits information regarding the terminal including the data of the number of terminals to each of the terminals.

5. A communication device comprising:
a communication controller configured to:
acquire a number of communication devices connected to the access point in a communication network,
divide, based on the number of communication devices, the communication devices into groups so that each group includes the number of communication devices equal to or smaller than the number of communication devices permitted to communicate with the access point within a predetermined period,
allocate the group to a time slot of the predetermined period, and
determine, based on the group to which a communication device belongs and time slot to which a group is allocated, whether to permit data transmission from the communication device to the access point.

6. The communication device according to claim 5, wherein only one group is allocated to each time slot as a group which is allowed to perform the data transmission.

7. The communication device according to claim 5, wherein:
the communication controller allocates the group based on a priority of transmission data, and
preferentially allocates a high-priority group to the time slot.

8. The communication device according to claim 5, wherein, when a new communication device participates in the access point, an external device connected to the communication network authenticates the new communication device, and transmits information regarding the communication device including the data of the number of communication devices to each of the communication devices.

9. A communication control method comprising the steps of:
acquiring a number of terminals connected to an access point in a communication network;
dividing, based on the number of terminals, the terminals into groups so that each group includes the number of terminals equal to or smaller than the number of terminals permitted to communicate with the access point within a predetermined period;
allocating the group to a time slot of the predetermined period; and determining, based on the group to which a terminal belongs and the time slot to which a group is allocated, whether to permit data transmission from the terminal to the access point.

10. A non-transitory computer readable medium that causes a computer to execute the following steps of:
acquiring a number of communication devices connected to an access point in a communication network;
dividing, based on the number of communication devices, the communication devices into groups so that each group includes the number of communication devices equal to or smaller than the number of communication devices permitted to communicate with the access point within a predetermined period;
allocating the group to a time slot of the predetermined period; and
determining, based on the group to which a communication device belongs and the time slot to which a group is allocated, whether to permit data transmission from the communication device to the access point.

* * * * *